UNITED STATES PATENT OFFICE 2,452,580

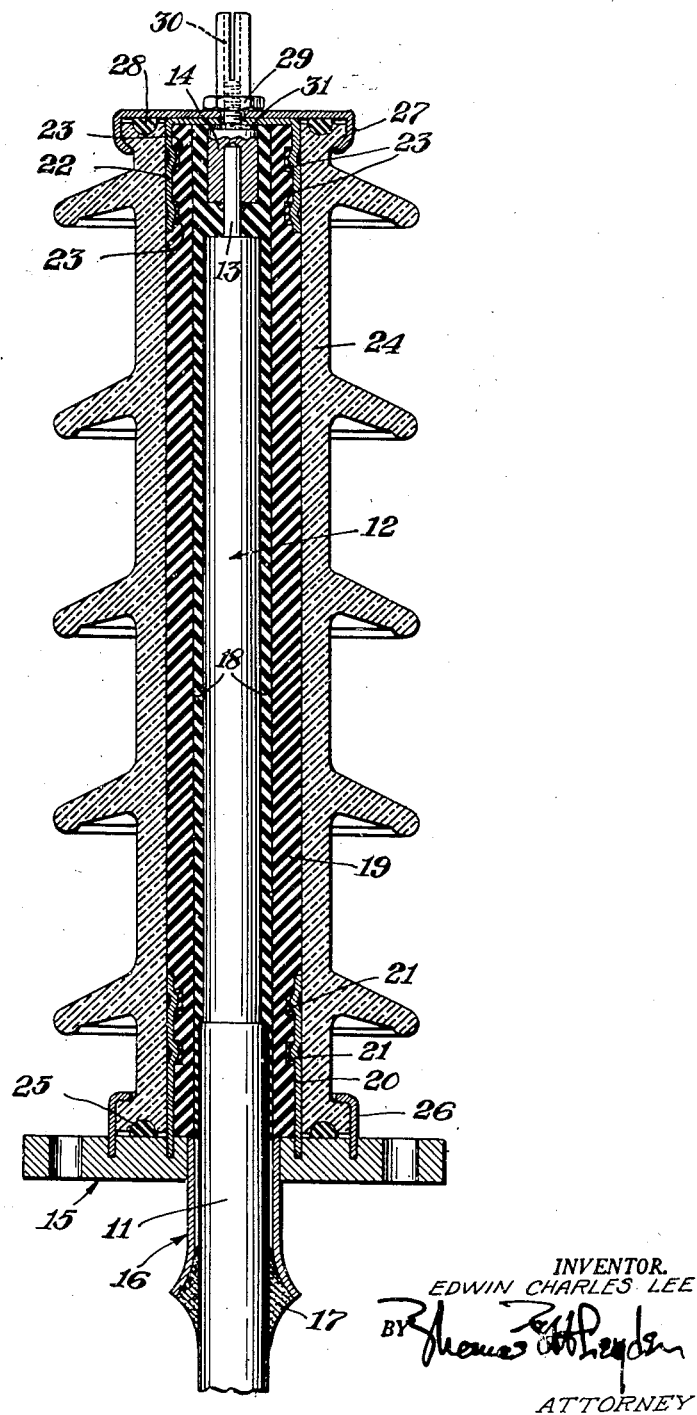

TERMINATION FOR ELECTRIC POWER CABLES

Edwin Charles Lee, London, England, assignor to Standard Telephones and Cables Limited, London, England, a British company Application February 19, 1945, Serial No. 578,666
In Great Britain February 25, 1944

5 Claims. (Cl. 174—20)

This invention relates to electric power cables and more particularly to terminations therefor.

Our prior British patent specification No. 542,842 describes and claims the manufacture of a power cable termination by lapping insulating material around a conductor core to form a barrier of built-up insulation having a uniform diameter, coating the built-up insulation with a lacquer which has the property of causing said insulation to swell, and then fitting over said built-up insulation a preformed sleeve of substantially the same bore so that said insulation upon swelling will tightly engage said sleeve. Prior to that invention it has been a common method of terminating a cable to use a porcelain insulator, considerably larger in diameter than the cable, and to fill the space between the insulator and the cable with an oil or some liquid compound, leaving a small space to take up the expansion of the liquid. With such a method there was the danger that the oil or liquid compound might flow back into the cable, leaving a portion of the cable-end exposed and therefore liable to damage by tracking; or again, that if the cable was of the oil filled type and the cable run were at a higher level than the termination then oil might flow into and dissolve the compound in the porcelain insulator so that during subsequent heating oil might leak out of, or even crack, the porcelain. The above mentioned prior patent specification is one of a number which sought to deal with this problem by making a solid seal between a built-up insulation and a close-fitting preformed sleeve.

The present invention carries this preference for a solid seal yet further; whereas the above mentioned patent specification contemplates that the space between the hollow porcelain insulator and the preformed sleeve shall be filled with oil or other insulating compound, the present invention proposes that this space too should be sealed solid. Thus oil or liquid compound is wholly eliminated from the termination.

The following description relates to the accompanying drawing which shows by means of an axial section the manufacture of a power cable termination constructed in accordance with the present invention.

The end of a cable that is to be terminated in the manner of the present invention first has its lead sheath 11 stripped back from the cable end to expose the required length of the insulated covering 12 such as a multi-layer winding of impregnated paper tape. Then this insulation 12 is in turn removed for a short distance from the end to expose the conductor core 13, and a copper end ferrule 14 is soldered to the end of the conductor 13. A mounting plate 15 and a flared sleeve 16 fixed in the central aperture of the mounting plate are fitted over the end of the cable and positioned a short way down on the lead sheath 11. The flared sleeve 16, extending rearwardly, is secured to the sheath 11 by solder 17. The surfaces of core 13, insulation 12, and the short length of cable 11, down to the mounting plate 15, are then lapped with insulating tape to form a built-up insulation 18 of uniform diameter along its length; this tape is preferably of partially acetylated cotton impregnated with a rubber-polystyrene mixture.

With the cable-end thus exposed and built-up, it is ready to receive a tube 19 preformed of insulating material such as paper impregnated with polystyrene. This tube has a bore substantially equal to the diameter of the built-up insulation so that it will be a tight fit; it may be fitted endwise or it may be split longitudinally for clamping round. In any case the filling is preceded by the step of coating the outside of the built-up insulation, with a solvent for the insulation, such as a lacquer; then when the tube 19 is fitted immediately afterwards, the built-up insulation material will tend to swell and give a good tight seal without voids. At its rearward or bottom end the preformed tube 19 is received within a copper gland 20 which is fixed in the mounting plate 15. An effective seal between the copper gland 20 and tube 19 is provided in the manner disclosed in our prior British patent specification No. 548,875, namely, by forming peripheral grooves in that part of the tube 19 to be within the gland 20, fitting rubber rings 21 in the grooves so as substantially to fill them, and then after assembly spinning corresponding indentations in the gland to put the rings under pressure. At the forward end is provided a somewhat similar gland 22 overlying and compressing sealing rings 23.

The assembly is now ready to receive the porcelain insulator 24 which is the outermost element; and, as already indicated, it is one of the features of the invention that there should be a solid seal between the preformed tube 19 and the porcelain 24. This solid bonding may be accomplished by coating the outer surface of the tube 19 with a solvent for the insulating material of the tube, just as in the case of bonding the built-up insulation 18 to the preformed tube 19. Thus, where the tube 19 is impregnated with polystyrene as above mentioned, the coating may be monomeric styrene or perhaps preferably a solution of polystyrene in monomeric styrene. The insulator 34 is a tight fit over the tube 19; and the monomeric styrene polymerises with time and forms a bonding which prevents the occurrence of voids between the two members. An annular rubber washer 25 fits into a recess in the rear end of the insulator 24 and seals the space between the insulator 24 and the mounting plate 15, while a sleeve 26 fixed in the mounting plate 15 is spun over a shoulder on the bottom of the insulator 24. At the forward or top end there is an end-cap 27 spun over a shoulder on the insulator 24, and engaging an annular rubber washer 28 similar to the washer 25. A nut 29 screwed onto the ferrule 14 clamps the assembly axially. A copper stalk 30 is screwed onto the ferrule 14 above the nut 29. Between the gland 22 and the ferrule 14 is a copper asbestos washer 31.

One of the advantages of the invention is that it enables the size of such terminations to be reduced.

Another and considerable advantage is that it enables most of the assembly to be done in the factory instead of on the site. Because it does not involve the use of a liquid, a sub-assembly consisting of the porcelain insulator 24, preformed tube 19, elements 27, 28, 23, 22, 20, 21, 25, 26, and mounting plates 15, 16, can be made up in the factory, leaving for the field only the job of stripping and building up the cable-end with tape 18 and ferrule 14, fitting the sub-assembly and wiping the joint 17.

It will be noticed that the bore of the porcelain insulator 24, like the outside of the styrenated tube 19 over which it fits, is of plain cylindrical contour, instead of being of the more usual slightly conical shape. The advantage of this is that should any axial shift occur between the two members, there will be no creation of a gap between them.

What is claimed is:

1. A terminating assembly for an electric cable having a conductor, covered by insulation and a metal sheath partly cut back and lapped with tape to form a built-up insulation of uniform diameter along its length comprising, a tubular member of insulating material adapted to tightly engage said insulating tape, a porcelain insulating member tightly fitted over said tubular member to form a bonding seal substantially throughout its contact surface, means for sealing said members at one end to said metal sheath, and means for sealing the other end of said members to said cable conductor.

2. A terminating assembly for an electric cable having a conductor within a metal sheath, said conductor being partly covered and partly uncovered by insulation within the sheath comprising, an annular mounting plate adapted to fit over and connect to the metal sheath of the cable, built-up insulation of substantially uniform diameter on the insulation covered portion of the conductor; an insulating tube adapted to tightly engage said built-up insulation about said cable, an enclosing porcelain insulator bonded to said tube, means for sealing one end of said porcelain insulator to said mounting plate, and terminating means for connection to the cable conductor and adapted to seal the other end of said porcelain insulator.

3. An assembly in accordance with claim 2, wherein said tube further comprises a preformed sleeve impregnated with polymerized insulating material and bonded to said porcelain insulator by said polymerized insulating material.

4. An assembly in accordance with claim 2, wherein said mounting plate further comprises, a flared sleeve to facilitate wiping a joint to said cable sheath, and said means for sealing said plate to said insulator further comprises a rubber washer therebetween which is partly recessed into said insulator.

5. An assembly in accordance with claim 2, wherein said terminating means comprises a metal ferrule on the uncovered tip of the cable conductor, an annular cap adapted to fit over and be tightened against the shoulder of said metal ferrule on the tip of said conductor and having a skirt about its periphery adapted to be spun over a shoulder of said porcelain insulator.

EDWIN CHARLES LEE.

REFERENCES CITED

The following references are of record in the file of this patent:

UNITED STATES PATENTS

| Number | Name | Date |
|---|---|---|
| 2,282,003 | Scott et al. | May 5, 1942 |
| 2,303,283 | Kirkwood et al. | Nov. 24, 1942 |
| 2,362,963 | Lee | Nov. 14, 1944 |

FOREIGN PATENTS

| Number | Country | Date |
|---|---|---|
| 542,842 | Great Britain | Jan. 29, 1942 |